United States Patent [19]

Sugarman

[11] Patent Number: 4,965,913
[45] Date of Patent: Oct. 30, 1990

[54] STRAP FOR GLASSES

[76] Inventor: Joseph Sugarman, 26 Princeville Ln., Las Vegas, Nev. 89113

[21] Appl. No.: 395,525

[22] Filed: Aug. 18, 1989

[51] Int. Cl.⁵ ............................................. A44B 21/00
[52] U.S. Cl. ......................................... 24/3 C; 24/301
[58] Field of Search ............. 24/3 C, 3 R, 3 K, 11 C, 24/115 A, 302, 301, 616, 241 SL, 241 PS, 238

[56] References Cited

U.S. PATENT DOCUMENTS

| | | | |
|---|---|---|---|
| 248,641 | 10/1881 | Etzensperger | 24/616 |
| 426,451 | 4/1890 | Johnson | 24/238 |
| 1,299,821 | 4/1919 | Carpmill et al. | 24/241 SL |
| 1,401,124 | 12/1921 | Adolfson | 24/11 C |
| 1,522,607 | 1/1925 | Anderson | 24/3 K |
| 2,819,650 | 1/1958 | Seron | 24/301 |
| 3,827,790 | 8/1974 | Wenzel | 24/3 C |
| 3,879,804 | 4/1975 | Lawrence | 24/3 C |
| 3,952,382 | 4/1976 | Vaage | 24/241 PS |
| 3,979,795 | 9/1976 | Seron | 24/3 C |
| 4,471,509 | 8/1984 | Marks | 24/3 C |

*Primary Examiner*—Victor N. Sakran
*Attorney, Agent, or Firm*—Gerstman & Ellis Ltd.

[57] ABSTRACT

A strap for glasses with forms a loop about each temple bar for retention thereto. By this invention, an enlargement is defined in the outer portion of each temple bar loop, to inhibit removal of a sliding member carried on the temple bar loop from its sliding relation with the temple bar loop, so that the sliding member cannot be lost.

10 Claims, 1 Drawing Sheet

STRAP FOR GLASSES

BACKGROUND OF THE INVENTION

It is common for the wearer of eye glasses to use a strap which is secured to each temple bar of the glasses so that the strap resides behind the head and neck of the wearer as the glasses are worn. Thus, the glasses may be worn in athletic events or just normal wear with less risk of loss.

Typically, such straps comprise a strap member made of woven cord or the like in which the strap member defines at each end a loop. Each strap member loop engages a flexible temple bar loop, which is typically made of flexible plastic material. The plastic temple bar loop is intended to fit about the ends of the temple bars, and then to be secured thereto by a sliding member which tightens a retention loop about the glasses temple bar, to secure each end of the strap to a temple bar.

The strap may be so constructed by known selection of material properties and dimensions that the sliding member tends to hold the retention loop about the temple bar in tightly retaining state, so that the strap remains secured to the glasses until one positively slides the sliding member to enlarge the retention loop, and thus to remove the temple bars of the glasses from their secured relationship.

As one disadvantage of prior art straps for glasses as described above, when they are not in use it is possible for the sliding member to slide completely off of the temple bar loop and be lost. When this happens, the glasses straps of the prior art become substantially useless, since they can no longer be tightly retained to the temple bars of eye glasses.

DESCRIPTION OF THE INVENTION

By this invention, the above problem is substantially eliminated. A simple, inexpensive modification inhibits or prevents the removal of the sliding member from the temple bar loop upon which it is carried. At the same time, the strap can be used in a normal manner to temporarily retain glasses by moving the sliding member to tighten a retention loop about glasses temple bars, and also to release the glasses from engagement with a strap by loosening the sliding member again.

In this invention, the strap for glasses comprises a strap member, a flexible temple bar loop carried at each end of the strap member, and a sliding member carried on each temple bar loop in surrounding and constricting relation, to permit size adjustment of a retention loop formed by the sliding member and the outer portion of the temple bar loop.

In accordance with this invention, an enlargement is defined by an outer portion of each temple bar loop, to inhibit removal of each sliding member from its sliding relation with its respective temple bar loop. This is typically accomplished in that the enlargement is large enough to prevent the sliding member from sliding across or around it. Thus, the sliding member cannot slide completely across the temple bar loop to become disengaged from the glasses strap, because the temple bar loop is attached at one end to the strap, and adjacent its other end the enlargement prevents disengagement of the sliding member.

Preferably, each sliding member carried on each temple bar loop is formed by a piece of coiled wire to define a substantially tubular structure, although other designs of sliding members may be used as well.

Each temple bar loop preferably defines an enlargement as described above which is positioned substantially at an end opposed to the strap member. Such an enlargement typically comprises a substantially spherical member which is integral with the remainder of the temple bar loop.

Typically, the respective temple-bar loops carried at opposed ends of the strap member are in interlocking relation with an end loop which is formed in the strap member at each end thereof.

DESCRIPTION OF SPECIFIC EMBODIMENT

Figure 1:
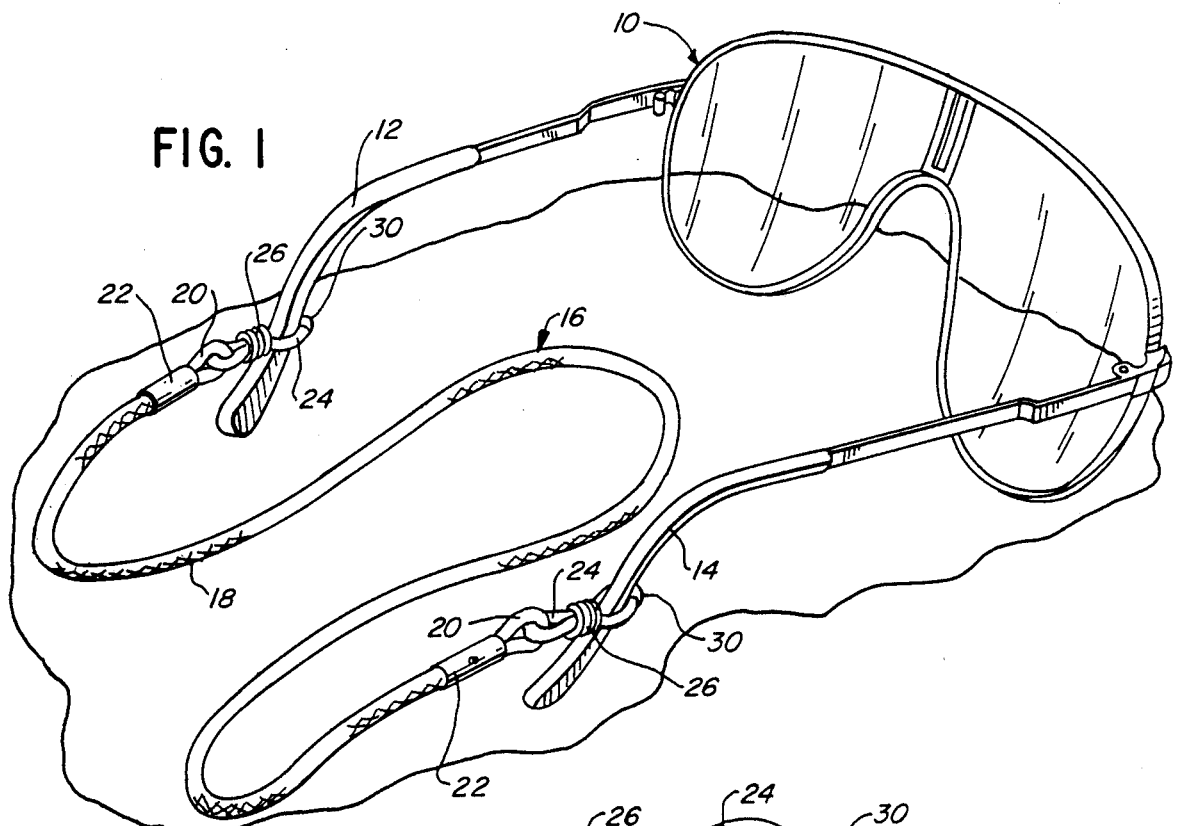
FIG. 1 is a perspective view of a pair of eye glasses which are attached to the strap member of this invention.

Referring to the drawings, eye glasses 10 are shown to have temple bars 12, 14 which are connected at the opposed ends of strap 16, which is made in accordance with this invention. Thus, the wearer has less worry about loss of the eye glasses during use.

Glasses strap 16 defines a strap member 18, which typically may be a woven cord. Strap member 18 terminates at each of its ends in a loop 20, which may be formed and retained by a metallic crimp member 22 which holds loop 20 together.

Loop 20 at each end of cord 18 engages a temple bar loop 24, which is typically an annular piece of flexible, strong plastic. In each case, flexible temple bar loop 24 is surrounded and constricted to flatness by a sliding member 26, which is designed to slide longitudinally along the flattened loop 24 on which it resides in a variety of positions including and extending between the positions of FIGS. 2 and 3, to respectively enlarge or reduce the size of a retention loop 28 formed by sliding member 26 and the outer portion of temple bar loop 24. Thus, when in the position of FIG. 2, the retention loop 28 is large, and temple bar 14 of a pair of glasses may be inserted therein. Then, sliding member 26 may be advanced toward the FIG. 3 position, to tighten loop 28 against the glasses temple bar for retention thereof in loop 28.

Figure 3:
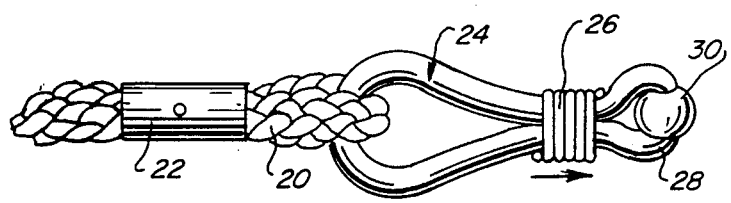
FIG. 3 is a similar enlarged, fragmentary plan view of an end of the strap of this invention, showing the sliding member positioned to reduce the size of the retention loop, and also showing how it is difficult or impossible for the sliding member to be removed from the temple bar loop even when there is no with a temple bar of a pair of glasses.

In accordance with this invention, temple bar loop 24 defines, at a position thereof which is opposed to loop 20 of the strap member and with sliding member 26 positioned therebetween, an enlargement 30 which is typically formed as an integral part of temple bar loop 24. Typically, temple bar loop 24 may be molded as an annular piece, with enlargement 30 being an integral part of the molding. Specifically, enlargement 30 may define a substantially spherical member which is integral with the remainder of the temple bar loop. Enlargement 30 is proportioned to inhibit the removal of its associated sliding member 26 by preventing its sliding off of the free end of temple bar loop 24. FIG. 3 represents the practical outward extreme sliding position of sliding member 26, with the result that sliding member 26 cannot be removed from its associated temple bar loop without special efforts, typically resulting in destruction of the unit. Thus, the sliding members 26 cannot be readily removed from their respective temple bar loops 24 and lost.

Preferably, the diameter of enlargement 30 is substantially at least as large as the inner diameter of coiled wire sliding member, or the inner diameter of any other substantially tubular sliding member that may be used.

Hence, by the simple expedient of enlargement 30 on temple bar loop 24, sliding member 26 becomes effectively non-removable from the temple bar loop 24, which provides a great improvement in the durability and operability of the glasses strap of this invention since the loss of a sliding member 26 renders the strap substantially useless for its purpose.

Figure 2:
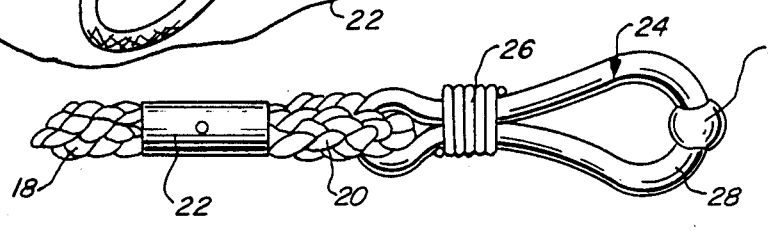
FIG. 2 is an enlarged, fragmentary plan view of one end of the strap of this invention, showing the sliding member in a position to define an enlarged retention loop in the temple bar loop, for receiving a temple bar of a pair of glasses.
Figure 4:
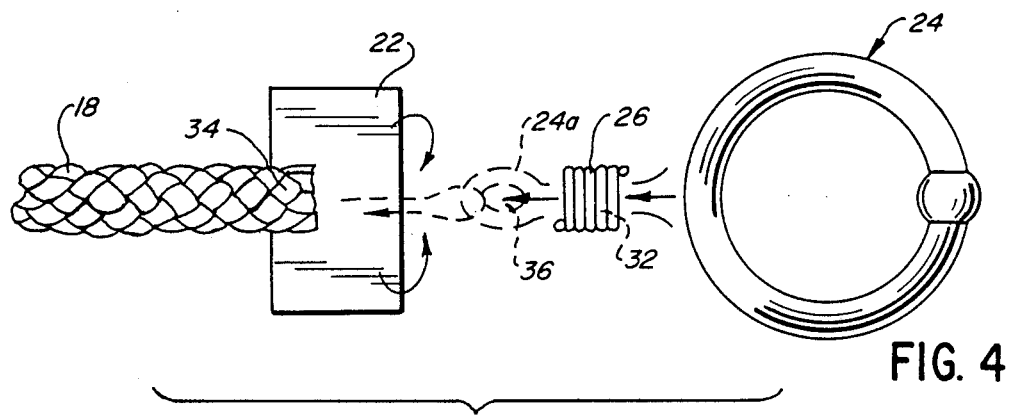
FIG. 4 is an exploded plan view of the end of the glasses strap of this invention in an intermediate stage of assembly.

Referring to FIG. 4, a simple technique for assembly of the glasses strap of this invention is shown. Temple bar loop 24 in its original, as-molded form, is shown. As indicated in FIG. 4, temple bar loop 24 may be flattened and threaded through the substantially tubular structure defined by the coiled wire sliding member 26, with the flattened inner end of temple bar loop 24a being shown in dotted lines as it is extended through the bore 32 of sliding member 26. Then, end 34 of strap member 18 may be threaded through the inner loop aperture 36 defined by inner loop 24a, and brought around to form loop 20 as shown in FIGS. 1-3. Loop 20 may then be secured by a conventional metal crimp 22 through the use of a crimping apparatus, to complete the assembly of the strap end as shown particularly in FIGS. 2 or 3.

Both ends of the strap member may be processed in accordance with FIG. 4, to obtain the finished product of this invention.

The above has been offered for illustrative purposes only, and is not intended to limit the scope of the invention of this application, which is as defined in the claims below.

That which is claimed is:

1. In a strap for glasses which comprises a strap member; a flexible temple bar loop carried at each end of the strap member; and a sliding member carried on each temple bar loop in surrounding and constricting relation, to permit size adjustment of a retention loop formed by the sliding member and the outer portion of the temple bar loop, the improvement comprising, in combination:

an enlargement defined by said outer portion of each temple bar loop, to inhibit removal of each sliding member from its relation with its respective temple bar loop.

2. The glasses strap of claim 1 in which each sliding member is formed by a coiled wire.

3. The glasses strap of claim 1 in which said temple bar loops are carried at each end of s id strap member in interlocking relation with an end loop formed in said strap member at each end thereof.

4. The glasses strap of claim 1 in which each temple bar loop is a molded piece of flexible plastic of annular shape, in its as-molded configuration.

5. In a strap for glasses which comprises a strap member; a flexible temple bar loop carried at each end of the strap member; a sliding member carried on each temple bar loop in surrounding and constricting relation, to permit size adjustment of a retention loop formed by the sliding member and the outer portion of the temple bar loop, said sliding member being formed by a coiled wire to define a substantially tubular structure through which the temple bar loop extends in flattened configuration, the improvement comprising, in combination:

an enlargement defined by said outer portion of each temple bar loop, to inhibit removal of each sliding member from its relation with its respective temple bar loop, said enlargement being positioned substantially at an end opposed to said strap member and comprising a substantially spherical member, integral with the remainder of said temple bar loop.

6. The glasses strap of claim 5 in which said temple bar loops are carried at each end of said strap member in interlocking relation with an end loop formed in said strap member at each end thereof.

7. The glasses strap of claim 6 in which each temple bar loop is a molded piece of flexible plastic of annular shape, in its as-molded configuration.

8. In a strap for glasses which comprises a strap member; a flexible temple bar loop carried at each end of the strap member; and a sliding member carried on each temple bar loop in surrounding and constricting relation, to permit size adjustment of a retention loop formed by the sliding member and the outer portion of the temple bar loop, the improvement comprising, in combination:

each temple bar loop defining an enlargement positioned substantially at an end opposed to the strap member and comprising a substantially spherical member, integral with the remainder of said temple bar loop, to inhibit removal of each sliding member from its relation with its respective temple bar loop.

9. The glasses strap of claim 8 in which each temple bar loop is a molded piece of flexible plastic of annular shape, in its as-molded configuration.

10. The glasses strap of claim 9 in which said temple bar loops are carried at each end of the strap member in interlocking relation with an end loop formed in said strap member at each end thereof.

* * * * *